United States Patent
Yoo

(10) Patent No.: US 7,180,436 B2
(45) Date of Patent: Feb. 20, 2007

(54) APPARATUS AND METHOD FOR AUTO CALIBRATION OF DISPLAY DEVICE

(75) Inventor: Tae-kwon Yoo, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 10/841,488

(22) Filed: May 10, 2004

(65) Prior Publication Data

US 2004/0233082 A1    Nov. 25, 2004

(30) Foreign Application Priority Data

May 21, 2003    (KR) .................. 10-2003-0032253

(51) Int. Cl.
  *H03M 1/10*    (2006.01)
  *H04N 17/02*    (2006.01)

(52) U.S. Cl. ............... 341/120; 348/177; 348/181

(58) Field of Classification Search ........... 341/118, 341/120; 348/181, 554, 572, 573, 574
See application file for complete search history.

(56) References Cited

U.S. PATENT DOCUMENTS

| | | | | |
|---|---|---|---|---|
| 4,772,948 A | * | 9/1988 | Irvin | 348/177 |
| 5,136,368 A | * | 8/1992 | Fairhurst | 348/177 |
| 5,369,432 A | * | 11/1994 | Kennedy | 348/181 |
| 5,963,249 A | * | 10/1999 | Kim | 348/178 |
| 5,978,745 A | | 11/1999 | Devine | |
| 5,990,982 A | * | 11/1999 | Gove et al. | 348/750 |
| 6,057,891 A | * | 5/2000 | Guerin et al. | 341/118 |
| 2005/0071108 A1 | * | 3/2005 | Kulidjian et al. | 702/117 |

FOREIGN PATENT DOCUMENTS

JP    05-076017    3/1993

OTHER PUBLICATIONS

Notice to Submit Response, dated Feb. 22, 2005.

* cited by examiner

*Primary Examiner*—Howard L. Williams
(74) *Attorney, Agent, or Firm*—Staas & Halsey LLP

(57) ABSTRACT

An apparatus for auto calibration of a display device, the apparatus including a signal generating unit for generating predetermined digital patterns, converting the digital patterns into R, G, B and Y, U, V color signals, converting the color signals into analog pattern signals, and outputting the analog pattern signals; a calibration performing unit for converting the analog pattern signals into digital pattern signals, adjusting the offset and gain of the digital pattern signals using control signals, and outputting the offset and gain of the digital pattern signals; and a control unit for operating the signal generating unit and the calibration performing unit once a calibration performing mode starts, comparing the digital pattern signals to reference values, and outputting the control signals for adjusting the offset and gain of the digital pattern signals such that the digital pattern signals are identical to the reference values.

33 Claims, 5 Drawing Sheets

<PATTERN>

WAVEFORM SHOWING STANDARD LEVEL OF Y EXCEPT FOR SYNC IN DTV-MODE CALIBRATION AND STANDARD LEVEL OF R, G, AND B IN PC-MODE CALIBRATION

WAVEFORM SHOWING STANDARD LEVEL OF U AND V EXCEPT FOR SYNC LEVEL IN DTV-MODE CALIBRATION

APPARATUS AND METHOD FOR AUTO CALIBRATION OF DISPLAY DEVICE

CROSS-REFERENCE TO RELATED APPLICATIONS

This application claims the priority of Korean Patent Application No. 2003-32253, filed on May 21, 2003, in the Korean Intellectual Property Office, the disclosure of which is hereby incorporated by reference.

BACKGROUND OF THE INVENTION

1. Field of the Invention

The present invention relates to a display device and a method used by the device, and more particularly, to an apparatus and a method to automatically calibrate a display device, which generate a pattern within the display device without connecting to external equipment.

2. Description of the Related Art

FIG. 1 is a block diagram of a conventional calibrating apparatus.

A PC-signal pattern generating signal 100 outside a display device generates standard signals (having a voltage range of 0V–700 mV), i.e., R, G, and B patterns. Also, a DTV signal pattern generating unit 110 outside the display device generates standard signals, i.e., Y, U, and V patterns.

An image board 120 carries out calibration using patterns generated by the PC signal pattern generating unit 100 or the DTV signal pattern generating unit 110. When the display device operates in a PC mode, a switch 120-1 switches to R, G, and B pattern signals. When the display device operates in a DTV mode, the switch 120-1 switches to Y, U, and V pattern signals.

A three-channel analog-to-digital converter (ADC) chip 120-2 is a calibration performing unit that carries out calibration. The calibration involves controlling gain and offset of a channel (three channels for the R, G, and B pattern signals or for the Y, U, and V pattern signals).

The three-channel ADC chip 120-2 converts the switched pattern signals (0V–700 mV in the case of PC signals) into 8-bit digital pattern signals ranging from 0V–255 mV. The minimum value and the maximum value among the converted digital pattern signals are stored in an internal register (not shown) of a scaler 120-3.

A micom 120-5 compares the minimum value and the maximum value among the converted digital pattern signals stored in the internal register (not shown) of the scaler 120-3 with a reference minimum value and a reference maximum value, respectively, stored in an electrically erasable programmable read-only memory (EEPROM) 120-4. The micom 120-5 outputs an offset adjusting signal to the three-channel ADC chip 120-2 to adjust the minimum value among the converted digital pattern signals to the reference minimum value 0V. Also, the micom 120-5 outputs a gain adjusting signal to the three-channel ADC chip 120-2 to adjust the maximum value among the converted digital pattern signals to the reference maximum value 255.

The three-channel ADC chip 120-2 adjusts the offset and gain of the digital pattern signals using the offset adjusting signal and the gain adjusting signal output from the micom 120-5.

U.S. Patent Publication No. 5,369,432 discloses an apparatus that calibrates the display device.

Conventionally, an external device must be directly connected to the display device to conduct the calibration, which requires human power. For automatic calibration, it is necessary to add a jig board to a signal cable, in which the occurrence of an overshoot and an undershoot degrades the quality of the calibration.

Also, as the automatic calibration progresses, special automatization equipment that controls a signal generator and an automatization remote controller are needed. In this case, in contrast to a case where a human performs calibration, the automization equipment cannot receive a signal indicating completion of the calibration from the display device, but proceeds with the calibration one-sidedly at a predetermined interval. As a result, when a calibration error occurs in a certain board, it is impossible to eliminate the calibration error.

SUMMARY OF THE INVENTION

The present invention provides an apparatus and a method to automatically calibrate a display device, which generate a pattern within the display device without connecting to external equipment, thereby performing automatic calibration.

According to one aspect of the present invention, there is provided an apparatus for auto calibration of a display device comprising a signal generating unit, a calibration performing unit, and a control unit.

The signal generating unit generates predetermined digital patterns, converts the digital patterns into R, G, B and Y, U, V color signals, converts the R, G, B and Y, U, V color signals into analog pattern signals, and outputs the analog pattern signals.

The calibration performing unit converts the analog pattern signals into digital pattern signals, adjusts the offset and gain of the digital pattern signals using control signals, and outputs the offset and gain of the digital pattern signals.

Once a calibration performing mode starts, the control unit operates the signal generating unit and the calibration performing unit, compares the digital pattern signals to reference values, and outputs the control signals for adjusting the offset and gain of the digital pattern signals such that the digital pattern signals are identical to the reference values.

The signal generating unit comprises a pattern generating unit, a color converting unit, and a digital-to-analog converter (DAC).

The pattern generating unit generates the predetermined digital patterns.

The color converting unit converts the digital patterns into the R, G, B and Y, U, V color signals.

The DAC converts the R, G, B and Y, U, V color signals into the analog pattern signals.

The control unit outputs a calibration completion signal if the digital pattern signals are identical to the reference values, and outputs a calibration failure signal if the digital pattern signals are different from the reference values even after the control unit outputs the control signals for adjusting the offset and gain of the digital pattern signals a reference number of times.

According to another aspect of the present invention, there is provided a method for automatic calibration of a display device.

The method comprises generating digital patterns inside the display device, converting the digital patterns into R, G, B and Y, U, V color signals, converting the R, G, B and Y, U, V color signals into analog pattern signals, and outputting the R, G, B and Y, U, V analog pattern signals, converting the outputted analog pattern signals into digital pattern signals and comparing the digital pattern signals with reference values, and adjusting the offset and gain of the digital pattern signals such that the digital pattern signals are identical to the reference values.

The method further comprises outputting the calibration completion signal if the digital pattern signals are identical to the reference values.

After adjusting the offset and gain of the digital pattern signals, if the digital pattern signals are different from the reference values, even after the offset and gain of the digital pattern signals are adjusted a reference number of times, a calibration failure signal is output.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
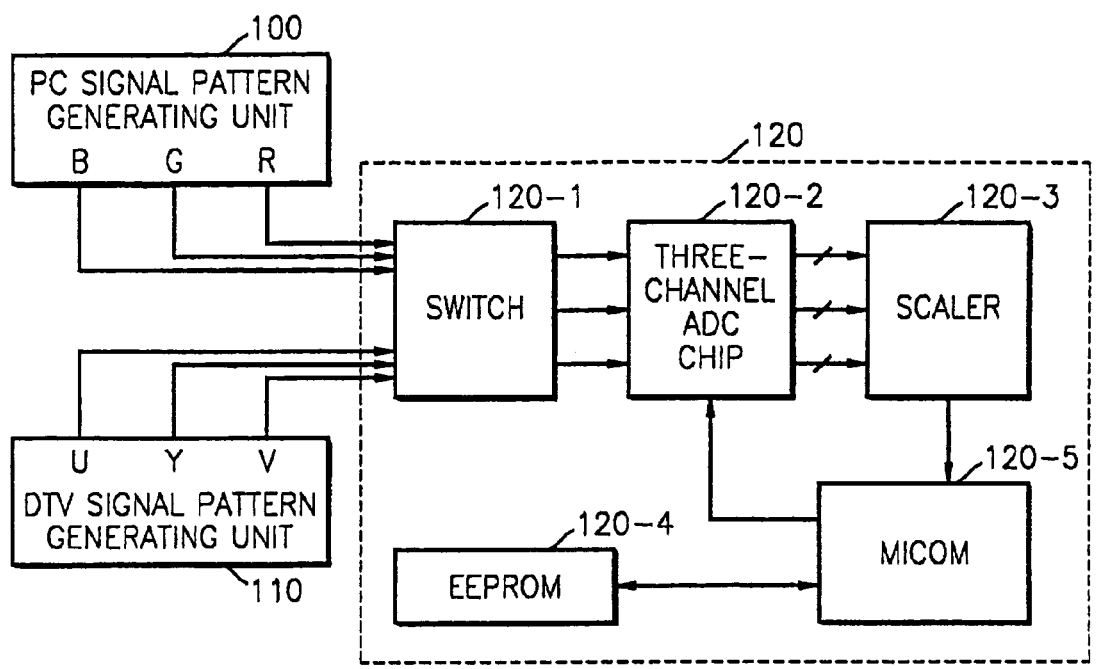
FIG. 1 is a block diagram of a conventional calibrating apparatus.

The present invention will now be described more fully with reference to the accompanying drawings, in which a preferred embodiment of the invention is shown. In the drawings, like reference numerals are used to refer to like elements throughout.

Figure 2:
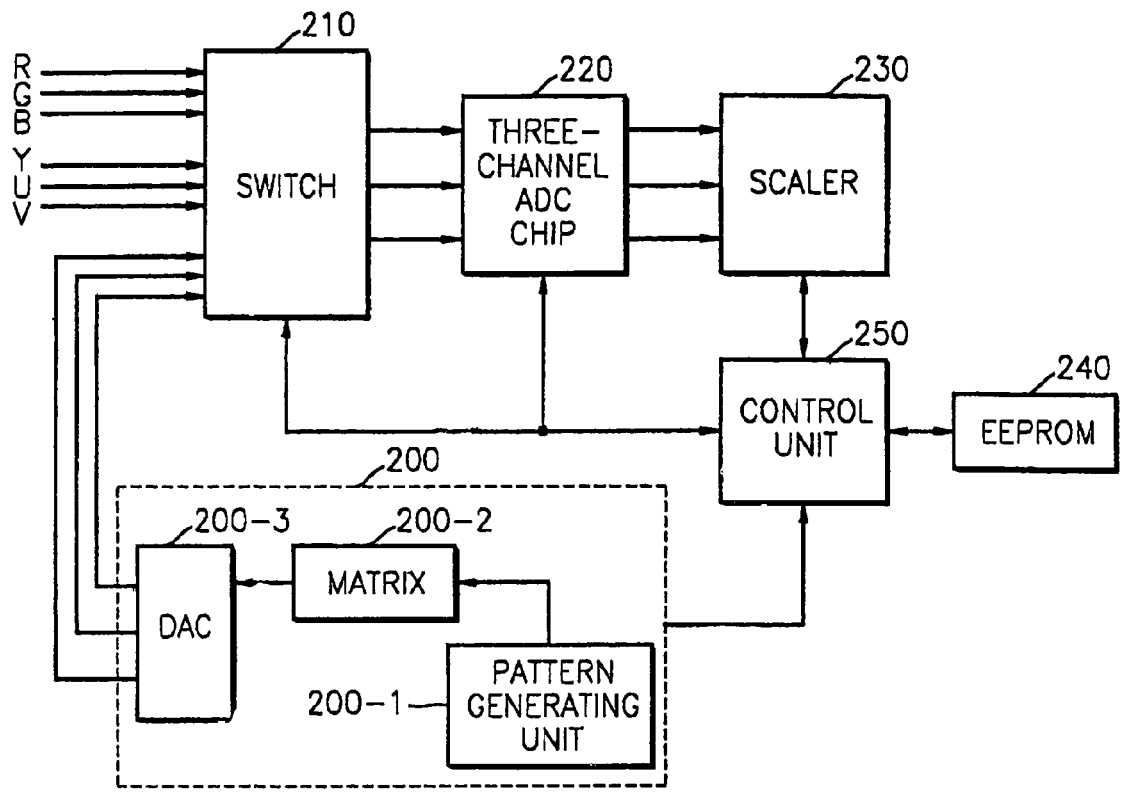
FIG. 2 is a block diagram of an apparatus to automatically calibrate a display device according to an embodiment of the invention.

FIG. 2 is a block diagram of an apparatus to automatically calibrate a display device according to an embodiment of the present invention. The apparatus includes a signal generating unit 200, a switch 210, a three-channel ADC chip 220, a scaler 230, an EEPROM 240, and a control unit 250. The signal generating unit 200 includes a pattern generating unit 200-1, a matrix 200-2, and a DAC 200-3.

Figure 3:
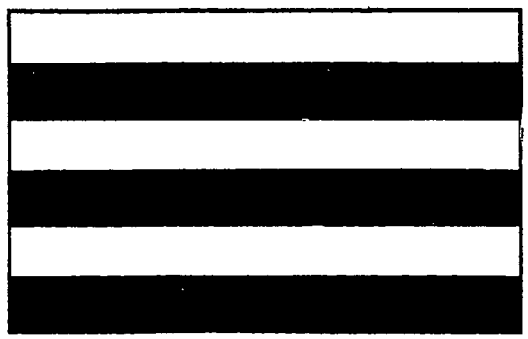
FIG. 3 illustrates a pattern used in calibration of a display device.

FIG. 3 illustrates a pattern used in calibration of a display device.

Figure 4A:
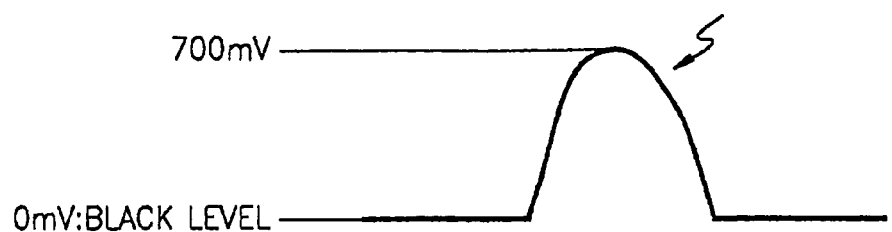
FIGS. 4A and 4B illustrate waveforms showing levels of color signals (Y, U, V and R, G, B) in a display device, except for sync levels of them.
Figure 4B:
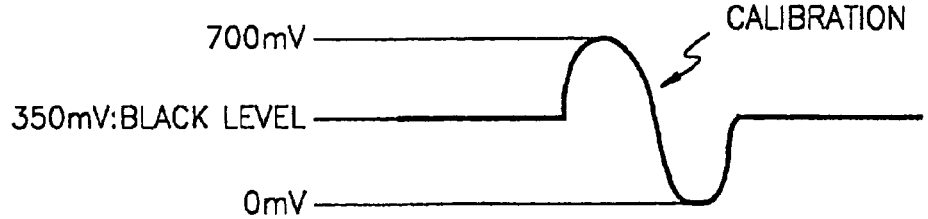

FIGS. 4A and 4B illustrate waveforms showing levels of color signals (Y, U, V, R, G, and B), except for a sync level in the display device.

Figure 5A:
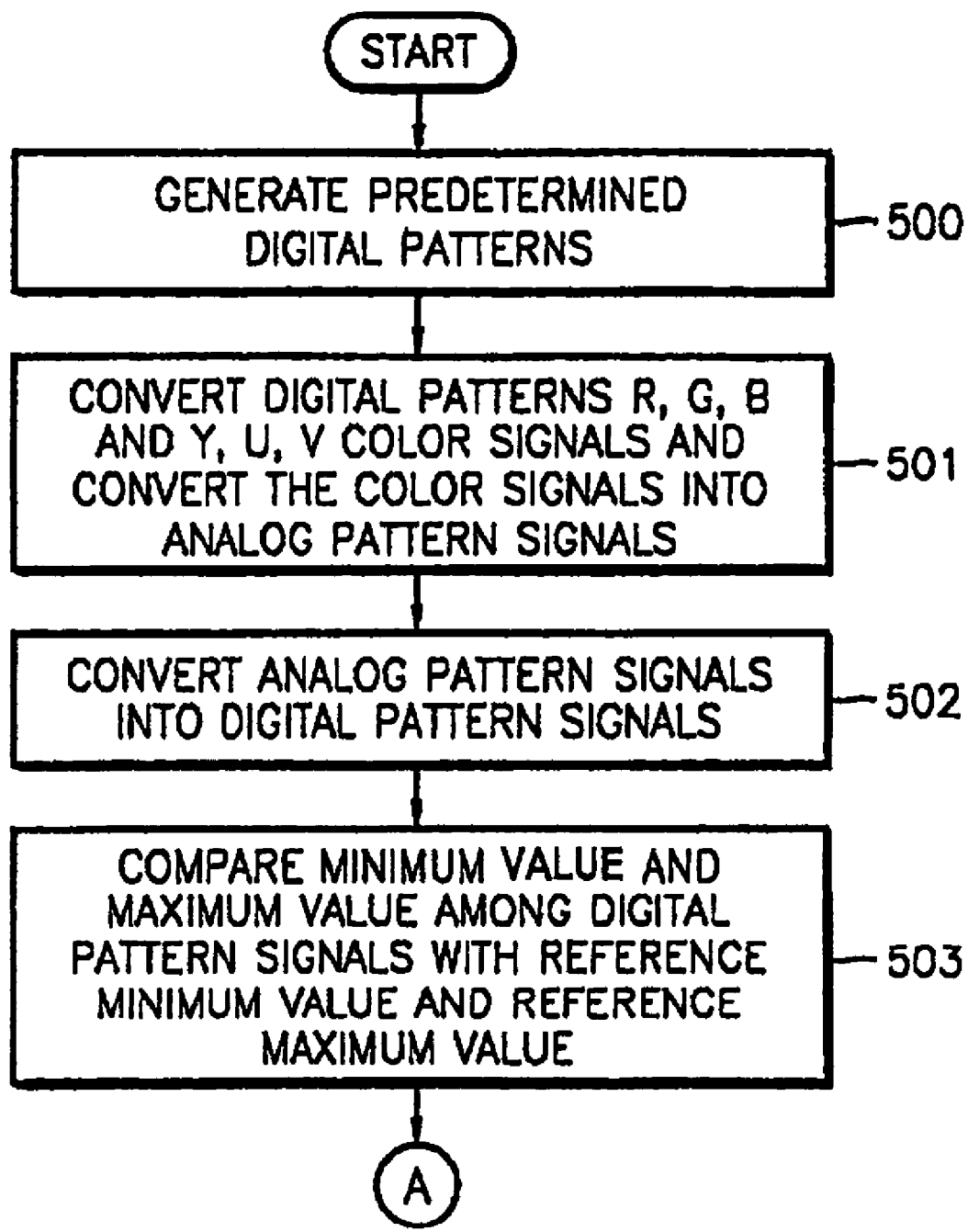
FIGS. 5A and 5B are a flowchart describing a method for automatic calibration of a display device according to the invention.
Figure 5B:
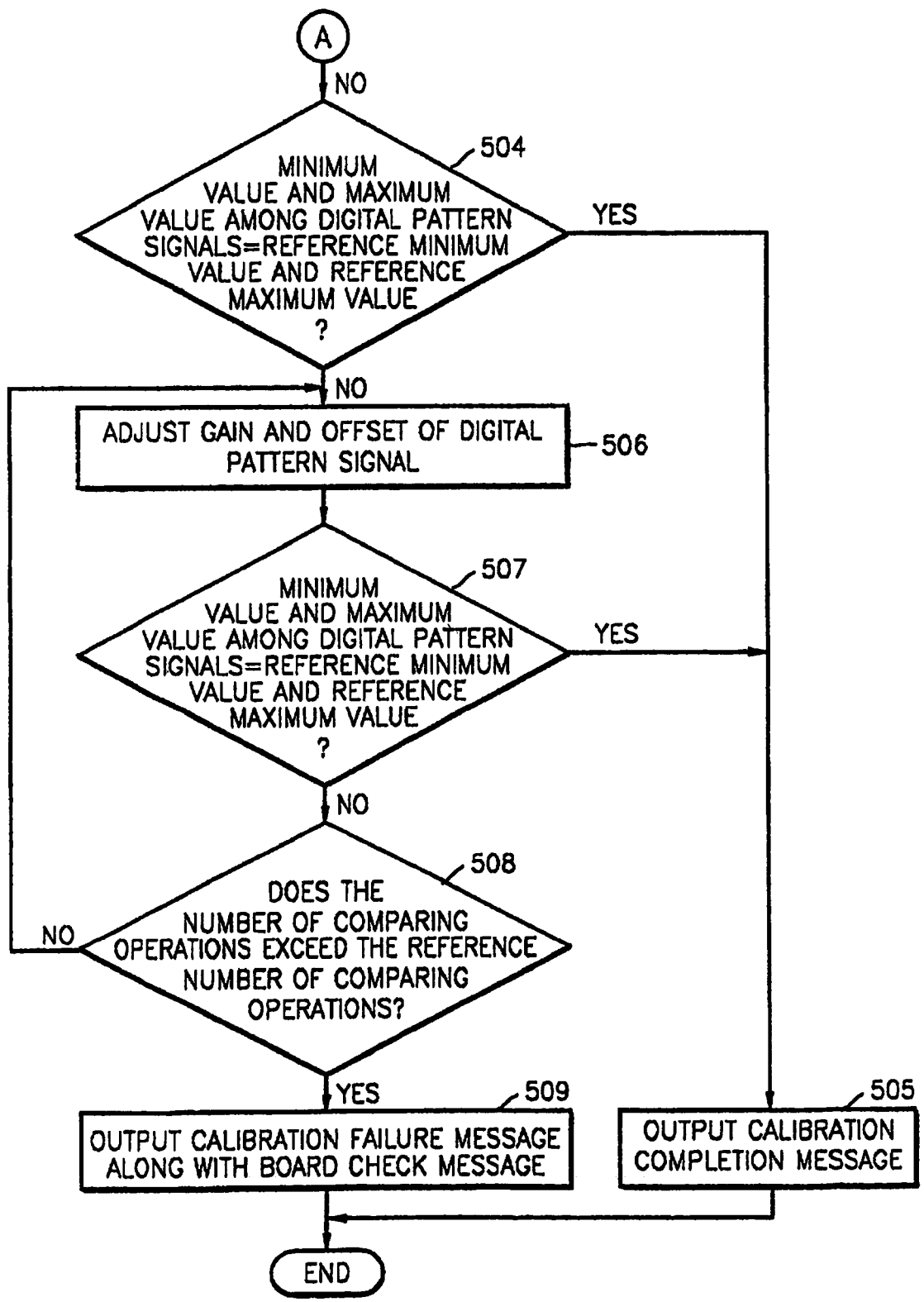

FIG. 5 is a flowchart describing a method for automatic calibration of a display device according to the invention.

Hereinafter, the invention will be described in detail with reference to FIGS. 2 through 5.

First, the apparatus for automatic calibration of a display device will be described with reference to FIGS. 2 through 4B.

Once a calibration performing mode starts after the completion of other sequences, the control unit 250 operates the signal generating unit 200, the switch 210, the three-channel ADC chip 220, and the scaler 230 and controls their operations. The display device in the present invention includes the signal generating unit 200 that includes a pattern generating unit 200-1, a matrix 200-2, and a DAC 200-3, which is different from a conventional display device.

Once the calibration mode starts, the signal generating unit 200 generates predetermined digital patterns under the control of the control unit 250, converts the digital patterns into R,G, B and Y, U, V color signals, converts the color signals into analog pattern signals, and outputs the analog pattern signals. The pattern generating unit 200-1 generates the predetermined digital patterns. An example of such a pattern used in the calibration of a display device is illustrated in FIG. 3. A variety of different patterns can be used in the calibration. In the pattern of FIG. 3, white portions are needed for gain calibration and black portions are needed for offset calibration.

The matrix 200-2 converts the digital patterns generated by the pattern generating unit 200-1 into R, G, B and Y, U, V color signals. If PC-mode calibration is set first in the control unit 250, the matrix 200-2 converts the digital patterns generated by the pattern generating unit 200-1 into R, G, B color signals. Thereafter, for DTV-mode calibration, the matrix 200-2 converts the digital patterns generated by the pattern generating unit 200-1 into Y, U, V color signals. If the DTV-mode calibration is set first in the control unit 250, the matrix 200-2 converts the digital patterns generated by the pattern generating unit 200-1 into Y, U, V color signals. Thereafter, for the PC-mode calibration, the matrix 200-2 converts the digital patterns generated by the pattern generating unit 200-1 into R, G, B color signals.

FIGS. 4A and 4B illustrate waveforms showing levels of color signals (Y, U, V and R, G, B) in the display device, except for sync levels of them. In the case of the PC-mode calibration, as shown in FIG. 4A, the standard levels of R, G, B color signals are in the range 0V–700 mV based on a ground voltage, and calibration is conducted using these levels. In a case of the DTV-mode calibration, the standard level of the Y color signal is in the range 0V–700 mV based on the ground voltage as shown in FIG. 4A. However, in a case of the DTV-mode calibration, the standard levels of the U and V color signals are 350 mV, as shown in FIG. 4B, and the calibration is conducted using this level.

The DAC 200-3 converts the R, G, B and Y, U, V color signals converted by the matrix 200-2 into analog pattern signals.

Normally, the switch 210 switches the R, G, B and Y, U, V color signals input from outside the display device. However, in a calibration mode, the switch 210 switches the R, G, B and Y, U, V color signals output from the signal generating unit 200 in response to a switching command of the control unit 250.

The three-channel ADC chip 220 is a calibration performing unit that performs calibration. The calibration involves adjusting gain and offset of a channel (three channels for the R, G, B and Y, U, V color signals).

The three-channel ADC chip 220 converts analog pattern signals (0V–700 mV: in a case of PC signals) output from the switch 210 into 8-bit digital pattern signals ranging from 0 to 255. The minimum value and the maximum value among the 8-bit digital pattern signals ranging 0V–255 mV are stored in an internal register (not shown) of the scaler 230.

The control unit 250 compares the reference minimum value and the reference maximum value stored in the EEPROM 240 with the minimum value and the maximum value among the digital pattern signals stored in the internal register of the scaler 230. The control unit 250 outputs the offset adjusting signal to the three-channel ADC chip 220 to adjust the minimum value among the digital pattern signals to the reference minimum value 0V. Also, the control unit 250 outputs the gain adjusting signal to the three-channel ADC chip 220 to adjust the maximum value of the digital pattern signals to the reference maximum value 255 mV.

The three-channel ADC chip 220 sets offset and gain of the digital pattern signals using the offset adjusting signal and the gain adjusting signal output from the control unit 250.

After the three-channel ADC chip 220 adjusts the offset and gain of the digital pattern signals, the control unit 250 re-compares the reference minimum value and the reference maximum value stored in the EEPROM 240 with the minimum value and the maximum value among the digital pattern signals stored in the internal register of the scaler 230.

As a result, if the reference minimum value and the reference maximum value stored in the EEPROM 240 are identical to the minimum value and the maximum value among the digital pattern signals stored in the internal register of the scaler 230, the control unit 250 outputs a calibration completion message.

However, if the reference minimum value and the reference maximum value stored in the EEPROM 240 are different from the minimum value and the maximum value among the digital pattern signals stored in the internal register of the scaler 230, the control unit 250 outputs the offset adjusting signal and the gain adjusting signal to the three-channel ADC chip 220 a reference number of times. Thereafter, if the reference minimum value and the reference maximum value stored in the EEPROM 240 are different from the minimum value and the maximum value of the digital pattern signals stored in the internal register of the scaler 230, the control unit 250 outputs a calibration failure message along with a board check message.

Hereinafter, a method for automatic calibration of a display device will be described with reference to FIGS. 3 through 5B.

According to operations 500 and 501, once the calibration performing mode starts, the control unit 250 operates to generate predetermined digital patterns inside the display device, convert the predetermined digital patterns into R, G, B and Y, U, V color signals, convert the R, G, B and Y, U, V color signals into analog pattern signals, and output the analog pattern signals. The pattern generating unit 200-1 inside the display device generates the predetermined digital patterns such as the one shown in FIG. 3. In the pattern of FIG. 3, white portions are needed for gain calibration and black portions are needed for offset calibration. The matrix 200-2 included in the display device converts the digital patterns generated by the pattern generating unit 200-1 into the R, G, B and Y, U, V color signals. FIGS. 4A and 4B illustrate waveforms showing levels of color signals (Y, U, V and R, G, B) in the display device, except for sync levels of them. In the case of PC-mode calibration, as shown in FIG. 4A, the standard levels of the R, G, B color signals are in the range 0V–700 mV based on a ground voltage, and the calibration is performed using these levels. In the case of DTV-mode calibration, the standard level of the Y color signal is in the range 0V–700 mV based on the ground voltage as shown in FIG. 4B. However, the standard levels of the U and V color signals are 350 mV, as shown in FIG. 4B, and the calibration is performed using these levels. The DAC 200-3 converts the R, G, B and Y, U, V color signals converted by the matrix 200-2 into analog pattern signals.

In operation 502, the analog pattern signals are input to the three-channel ADC chip 220 through the switch 210, and the three-channel ADC chip 220 converts the analog pattern signals (0V–700 mV: in a case of PC signals) into 8-bit digital pattern signals ranging from 0V to 255 mV.

In operation 503, the control unit 250 compares the minimum value and the maximum value among the digital pattern signals converted by the three-channel ADC chip 220 with the reference minimum value and the reference maximum value stored in the EEPROM 240.

In operations 504 and 505, if the minimum value and the maximum value among the digital pattern signals are identical to the reference minimum value and the reference maximum value stored in the EEPROM 240, the control unit 250 outputs the calibration completion message.

In operation 506, if the minimum value and the maximum value among the digital pattern signals are different from the reference minimum value and the reference maximum value stored in the EEPROM 240, the control unit 250 adjusts the gain and offset of the digital pattern signals. The control unit 250 outputs the offset adjusting signal to the three-channel ADC chip 220 to adjust the minimum value among the digital pattern signals to the reference minimum value 0V. Also, the control unit 250 outputs the gain adjusting signal to the three-channel ADC chip 220 to adjust the maximum value among the digital pattern signals to the maximum value 255 mV. The three-channel ADC chip 220 performs calibration that involves adjusting the offset and gain of the digital pattern signals using the offset adjusting signal and the gain adjusting signal output from the control unit 250.

In operation 507, after the three-channel ADC chip 220 adjusts the offset and gain of the digital pattern signals, the control unit 250 re-compares the reference minimum value and the reference maximum value stored in the EEPROM 240 with the minimum value and the maximum value among the digital pattern signals stored in the internal register of the scaler 230, and if the minimum value and the maximum value among the digital pattern signals are identical to the reference minimum value and the reference maximum value stored in the EEPROM 240, the control unit 250 outputs the calibration completion message.

However, in operation 508, if the minimum value and the maximum value among the digital pattern signals are different from the reference minimum value and the reference maximum value stored in the EEPROM 240, the control unit 250 determines whether the number of comparing operations exceeds the reference number of comparing operations.

If the number of comparing operations is less than the reference number of comparing operations, the process proceeds again to operation 506. However, in operation 509, if the number of comparing operations exceeds the reference number of comparing operations, the control unit 250 outputs the calibration failure message along with the board check message.

As described above, according to the present invention, since a pattern is generated inside a display device and calibration is automatically carried out, human power or special equipment for the calibration is not needed.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for auto calibration of a display device, the apparatus comprising:
   a signal generating unit, generating predetermined digital patterns, converting the digital patterns into R, G, B and Y, U, V color signals, converting the R, G, B and Y, U, V color signals into analog pattern signals, and outputting the analog pattern signals;
   a calibration performing unit, converting the analog pattern signals into digital pattern signals, adjusting an offset and gain of the digital pattern signals using control signals, and outputting the offset and gain of the digital pattern signals; and
   a control unit, operating the signal generating unit and the calibration performing unit once a calibration performing mode starts, comparing the digital pattern signals to reference values, and outputting the control signals adjusting the offset and gain of the digital pattern signals such that the digital pattern signals are identical to the reference values.

2. The apparatus of claim 1, wherein the signal generating unit comprises:
   a pattern generating unit, generating the predetermined digital patterns;
   a color converting unit, converting the digital patterns into the R, G, B and Y, U, V color signals; and
   a digital-to-analog converter converting the R, G, B and Y, U, V color signals into the analog pattern signals.

3. The apparatus of claim 1, wherein the control unit outputs a calibration completion signal if the digital pattern signals are identical to the reference values, and outputs a calibration failure signal if the digital pattern signals are different from the reference values after the control unit outputs the control signals adjusting the offset and gain of the digital pattern signals a reference number of times.

4. A method for automatic calibration of a display device, the method comprising:
   generating digital patterns inside the display device;
   converting the digital patterns into R, G, B and Y, U, V color signals;
   converting the R, G, B and Y, U, V color signals into analog pattern signals and outputting the analog pattern signals;
   converting the analog pattern signals into digital pattern signals and comparing the digital pattern signals with reference values; and
   adjusting an offset and gain of the digital pattern signals such that the digital pattern signals are identical to the reference values.

5. The method of claim 4, further comprising outputting a calibration completion signal if the digital pattern signals are identical to the reference values.

6. The method of claim 4, wherein after adjusting the offset and gain of the digital pattern, if the digital pattern signals are different from the reference values after the offset and gain of the digital pattern signals are adjusted a reference number of times, the method further comprising outputting calibration failure signal.

7. An apparatus for performing an automatic calibration of a display device wherein a pattern is generated within the display device, comprising:
   a first unit outputting a plurality of analog pattern signals corresponding to color signals;
   a second unit converting the analog pattern signals into a digital pattern signal; and
   a control unit controlling the outputting and converting of the first and second units once a calibration performing mode starts in order to adjust an offset and gain of the digital pattern signal so that the digital pattern signal matches a reference signals,
   wherein the display device operates in one of at least a PC-mode and a DTV-mode.

8. The apparatus of claim 7, further comprising a switch switching the output from the first unit in response to a switching command from the control unit according to an operating mode of the display device.

9. The apparatus of claim 8, further comprising an electrically erasable programmable read-only memory to store and provide the control unit with a minimum and a maximum reference value of the digital pattern signal.

10. The apparatus of claim 9, wherein the first unit comprises:
    a pattern generator generating a predetermined digital pattern;
    a color converter converting the predetermined digital pattern into the color signals; and
    a digital-to-analog converter converting the color signals into the analog pattern signals.

11. The apparatus of claim 10, wherein the second unit comprises a three-channel analog-to-digital chip to convert analog pattern signals output from the switch into 8-bit digital pattern signals and to calibrate the color signal by adjusting gain and offset of at least one channel of the color signal.

12. The apparatus of claim 11, further comprising a scaler unit having an internal register storing a minimum value and a maximum value of the 8-bit digital pattern signal, wherein the reference minimum value and the reference maximum value stored in the electrically erasable programmable read-only memory are compared with the minimum and the maximum value among the digital pattern signals stored in the internal register of the scaler.

13. The apparatus of claim 12, wherein the minimum and maximum value of the 8-bit digital pattern signal is 0 mV and 255 mV, respectively.

14. The apparatus of claim 13, wherein the color signals comprise an R, G, B pattern for the PC-mode, and a Y, U, V pattern for the DTV-mode.

15. The apparatus of claim 7, wherein the color signals comprise an R, G, B pattern for the PC-mode, and a Y, U, V pattern for the DTV-mode.

16. The apparatus of claim 7, wherein the control unit outputs a calibration completion signal if the digital pattern signal is identical to the reference values, and outputs a calibration failure signal if the digital pattern signal is different from the reference values.

17. A method of performing an automatic calibration of a display device, comprising:
    generating a predetermined digital pattern inside the display device;
    converting the predetermined digital pattern into a plurality of analog pattern signals corresponding to a color signal, wherein the color signals comprise an RGB pattern when using the display device in a PC-mode, and a YUV pattern when using the display device in a DTV mode;
    converting the plurality of analog pattern signals into a digital pattern signals;

comparing the digital pattern signals with a minimum and a maximum reference value; and calibrating a gain and offset of the digital pattern signals if the digital pattern signals do not match the minimum and maximum reference values such that the digital pattern signals match the minimum and maximum reference values.

18. The method of claim 17, further comprising outputting a calibration completion message if the minimum and maximum values among the digital pattern signals are identical to the reference minimum and maximum values stored in an electrically erasable programmable read-only memory.

19. The method of claim 18, further comprising outputting an offset adjusting signal and a gain adjusting signal to a three-channel analog-to-digital circuit a reference number of times to calibrate the gain and offset of the digital pattern signals if the minimum and maximum reference values stored in the electrically erasable programmable read-only memory are different from the minimum and maximum values of the digital pattern signals.

20. The method of claim 19, further comprising repeating the comparing operation until the number of comparing operations exceeds the reference number of comparing operations.

21. The method of claim 20, further comprising outputting a calibration failure message and a board check message if the number of comparing operations exceeds the reference number of comparing operations.

22. The method of claim 21, wherein the generating the predetermined digital pattern inside the display device and the calibrating the gain and offset of the digital pattern signals are automatically performed and do not require user interaction or additional calibration equipment.

23. The method of claim 22, wherein the generating the predetermined digital pattern comprises using a portion of the predetermined digital pattern for gain calibration and a portion of the predetermined digital pattern for offset calibration.

24. The method of claim 23, wherein the converting the predetermined digital pattern into the plurality of analog pattern signals corresponding to the color signals comprises converting the digital patterns into R, G, B or Y, U, V color signals.

25. The method of claim 24, further comprising calibrating the gain and offset using the R, G, B color signals ranging from 0V–700 mV based on a ground voltage for a PC-mode calibration, and using each of the Y color signal ranging from 0V–700 mV based on the ground voltage and the U and V color signals of 350 mV based on the ground voltage for a DTV-mode.

26. The method of claim 25, wherein the converting the analog pattern signals into the digital pattern signals comprises converting the analog pattern signals into 8-bit digital pattern signals ranging from 0V to 255 mV.

27. The method of claim 26, further comprising outputting a calibration completion message if the minimum and maximum values among the digital pattern signals are identical to the reference minimum and maximum values.

28. The method of claim 27, wherein the calibrating the gain and offset of the digital pattern signals if the 8-bit digital pattern signals do not match the minimum and maximum reference values comprises calibrating the minimum value among the digital pattern signals to the reference minimum value of 0V and the maximum value among the digital pattern signals to the reference maximum level of 255 mV and re-comparing the minimum and maximum reference values with the minimum and maximum value among the digital pattern signals.

29. The method of claim 17, wherein the generating the predetermined digital pattern inside the display device and the calibrating the gain and offset of the digital pattern signals are automatically performed and do not require user interaction or additional calibration equipment.

30. The method of claim 17, wherein the calibrating the gain and offset of the digital pattern signal comprises outputting offset adjusting signals to calibrate the minimum value of the digital pattern signals to the reference minimum value and outputting a gain adjusting signal to calibrate the maximum value of the digital pattern signals to the reference maximum value.

31. The method of claim 30, wherein the minimum and maximum reference value is 0V and 255 mV, respectively.

32. The method of claim 17, wherein when calibrating the display device in the DTV-mode, performing the calibration using the Y color signal ranging from 0V–700 mV based on the ground voltage and the U and V color signals are each approximately 350 mV.

33. The method of claim 17, wherein when calibrating the display device in the DTV-mode, performing the calibration using the Y color signal ranging from 0V–700 mV based on the ground voltage and the U and V color signals are each approximately 350 mV.

* * * * *

UNITED STATES PATENT AND TRADEMARK OFFICE
CERTIFICATE OF CORRECTION

| | | |
|---|---|---|
| PATENT NO. | : 7,180,436 B2 | Page 1 of 1 |
| APPLICATION NO. | : 10/841488 | |
| DATED | : February 20, 2007 | |
| INVENTOR(S) | : Tae-kwon Yoo | |

It is certified that error appears in the above-identified patent and that said Letters Patent is hereby corrected as shown below:

Column 8, Line 9, change "signals," to --signal,--.

Signed and Sealed this

Nineteenth Day of June, 2007

JON W. DUDAS
*Director of the United States Patent and Trademark Office*